(12) United States Patent
Kuehne

(10) Patent No.: US 9,679,352 B2
(45) Date of Patent: Jun. 13, 2017

(54) METHOD FOR OPERATING A DISPLAY DEVICE AND SYSTEM WITH A DISPLAY DEVICE

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 53 days.

(21) Appl. No.: 14/751,571

(22) Filed: Jun. 26, 2015

(65) Prior Publication Data
US 2015/0379775 A1 Dec. 31, 2015

(30) Foreign Application Priority Data

Jun. 26, 2014 (DE) .................. 10 2014 009 699

(51) Int. Cl.
  *G09G 5/12* (2006.01)
  *G06T 3/00* (2006.01)
  *G02B 27/01* (2006.01)
  *G06F 3/01* (2006.01)

(52) U.S. Cl.
  CPC .............. *G06T 3/00* (2013.01); *G02B 27/017* (2013.01); *G02B 27/0172* (2013.01); *G06F 3/012* (2013.01); *G02B 2027/0178* (2013.01); *G02B 2027/0187* (2013.01)

(58) Field of Classification Search
  CPC .................................................. G06T 19/006
  USPC ......................................................... 345/633
  See application file for complete search history.

(56) References Cited

U.S. PATENT DOCUMENTS

| | | | | |
|---|---|---|---|---|
| 6,500,008 B1* | 12/2002 | Ebersole | ............ | A62C 99/0081 345/441 |
| 7,613,356 B2* | 11/2009 | Uchiyama | ................. | G06T 7/73 345/633 |
| 7,817,161 B2* | 10/2010 | Lefebvre | ............... | G06T 11/001 345/582 |
| 8,675,017 B2* | 3/2014 | Rose | ........................ | A63F 13/00 345/633 |
| 8,817,047 B1* | 8/2014 | Lee | ........................ | G09G 3/003 345/632 |
| 8,913,057 B2* | 12/2014 | Ishige | ....................... | G06K 9/00 345/418 |
| 8,970,624 B2* | 3/2015 | Baseley | ................ | A63F 13/213 345/633 |

(Continued)

FOREIGN PATENT DOCUMENTS

DE  10 2014 009 699.8  6/2014
EP       2818977       12/2014

OTHER PUBLICATIONS

German Office Action for German Priority Patent Application No. 10 2014 009 699.8, issued on Jan. 27, 2015, 7 pages.

*Primary Examiner* — Javid A Amini
(74) *Attorney, Agent, or Firm* — Staas & Halsey LLP

(57) ABSTRACT

A method for operating a display device Involves displaying at least one virtual object from a virtual observation position by virtual reality glasses, continuously detecting a position of the virtual reality glasses, determining, using the continuously detected position of the virtual reality glasses, whether the glasses are disposed in a specified region, and displaying the virtual object from the same virtual observation position by means of the display device as long as the virtual reality glasses are disposed in the specified region. A system includes virtual reality glasses.

19 Claims, 3 Drawing Sheets

(56) References Cited

U.S. PATENT DOCUMENTS

| | | | |
|---|---|---|---|
| 2005/0008264 A1* | 1/2005 | Iida | G06F 17/30265 |
| | | | 382/305 |
| 2006/0221098 A1* | 10/2006 | Matsui | G06T 7/74 |
| | | | 345/633 |
| 2007/0252833 A1* | 11/2007 | Kuroki | G06T 15/20 |
| | | | 345/427 |
| 2008/0266323 A1* | 10/2008 | Biocca | G06F 3/014 |
| | | | 345/633 |
| 2010/0182340 A1* | 7/2010 | Bachelder | G02B 27/017 |
| | | | 345/633 |
| 2011/0213664 A1* | 9/2011 | Osterhout | G02B 27/017 |
| | | | 705/14.58 |
| 2012/0019547 A1* | 1/2012 | Tjen | G06T 19/006 |
| | | | 345/589 |
| 2012/0229509 A1* | 9/2012 | Liu | G06F 3/011 |
| | | | 345/633 |
| 2012/0293506 A1* | 11/2012 | Vertucci | G06N 3/04 |
| | | | 345/419 |
| 2013/0050432 A1* | 2/2013 | Perez | H04N 13/0278 |
| | | | 348/47 |
| 2014/0354689 A1* | 12/2014 | Lee | A61B 1/00045 |
| | | | 345/633 |
| 2014/0375687 A1* | 12/2014 | Tanaka | G02B 27/0172 |
| | | | 345/633 |
| 2016/0225164 A1* | 8/2016 | Tomlin | G06T 15/04 |

\* cited by examiner

METHOD FOR OPERATING A DISPLAY DEVICE AND SYSTEM WITH A DISPLAY DEVICE

CROSS REFERENCE TO RELATED APPLICATIONS

This application is based on and hereby claims priority to German Application No. 10 2014 009 699.8 filed on Jun. 26, 2014, the contents of which are hereby incorporated by reference.

BACKGROUND

The invention relates to a method for operating a display device and a system with a display device.

Virtual reality glasses are increasingly used for example to support realistic product presentations during a sales talk. Virtual reality glasses are a certain form of a so-called head-mounted display, which is a visual output device worn on the head. It presents images on a display screen close to the eye or projects them directly onto the retina. In addition, virtual reality glasses also have sensors for detecting displacement of the head. This enables the display of the calculated illustration to be adapted to the movement of the wearer of the glasses. As a result of the physical proximity, the displayed image areas of the head-mounted display appear significantly larger than the free-standing display screens and in the extreme case even cover the entire field of view of the user. Because the display follows all head movements of the wearer as a result of the head mounting, he gets the impression of moving directly in a landscape generated by a computer.

By such virtual reality glasses therefore, a type of virtual reality can be displayed, wherein the display and simultaneous perception of reality in its physical properties in an interactive virtual environment that is computer generated in real time is usually referred to as virtual reality.

In particular, if such virtual reality glasses are used for the presentation of a virtual product, it can be of interest that the image that is currently being seen by a user wearing the virtual reality glasses can also be displayed on an external display screen. This can for example be used to allow a salesperson and/or an associate of the user of the virtual reality glasses to see the same as the user wearing the virtual reality glasses sees. A challenge in this connection is to be able to decide, using suitable criteria, when the image displayed to the user by the virtual reality glasses should also be displayed on an external monitor.

SUMMARY

It is one possible object to provide a method for operating a display device and a system with a display device by which it can be determined in a simple manner when an image displayed by the virtual reality glasses should also be displayed by means of the display device.

The inventor proposes a method for operating a display device, at least one virtual object is displayed from a virtual observation position by virtual reality glasses. During this a position of the virtual reality glasses is continuously detected. Using the continuously detected position of the virtual reality glasses, it is determined whether said glasses are in a specified region. The virtual object is displayed from the same virtual observation position by the display device while the virtual reality glasses are disposed in the specified region.

It is thus provided to continuously check whether the virtual reality glasses are disposed in a specified region. Using said criterion it is decided whether the image reproduced by the virtual reality glasses should be reproduced on the display device that is different from the virtual reality glasses, for example a computer display screen, a television screen or similar, for example for other observers. The proposals are based on the knowledge that the display by an external display device of similar contents as the wearer of the virtual reality glasses can see only makes sense while the virtual reality glasses are also actually being worn by a user.

If the user removes the virtual reality glasses, the position of the virtual reality glasses changes automatically such that the glasses are disposed outside of the specified region. Using said information, it can be determined in a simple way that the image possibly still being displayed as above by the virtual reality glasses is no longer relevant for other people, so that the image is also no longer displayed on the external display device.

The specified region corresponds here to a defined volume, for example a cube with a cubic meter spatial content, which is disposed about the head of the user wearing the virtual reality glasses so that the head is substantially disposed centrally within said cube. However, the volume and the dimensions of the specified region can also be selected to be larger for example. It is crucial that the specified region is chosen to be large enough for a preferably seated user to be able to move his head forwards, backwards, to the left and to the right as far as he usually would do when wearing the virtual reality glasses, without leaving the specified region with the virtual reality glasses being worn. In other words, the specified region is disposed and dimensioned such that the virtual reality glasses remain within the specified region within the usual range of movement of the user. The size and arrangement of the specified region can for example also be adjusted depending on the body size of a respective user that is wearing the virtual reality glasses and/or using his respective individual range of movement while wearing the virtual reality glasses.

Preferably, the virtual object displayed by the display device is hidden once it is determined that the virtual reality glasses are disposed outside of the specified region. This is because it can be assumed therefrom that once the virtual reality glasses are outside of the specified region they have been taken off by the user, so that the content that may be continuing to be displayed by the virtual reality glasses is also no longer of interest for other people, because the user can no longer see said image contents because the virtual reality glasses themselves have been taken off. Alternatively, a display mode of the display device can also be set that displays the virtual object from a predetermined perspective instead of hiding the virtual object. This means that the virtual object is displayed starting from a specified virtual observation position with a virtual direction of view starting from the same specified virtual observation position. Or the display mode of the display device can also be set such that a type of virtual round trip around the virtual object is displayed. During this a virtual camera moves on a specified path around the virtual object, wherein the object is displayed on the display device from the perspective of the virtual camera.

Another advantageous embodiment provides that infrared light is emitted by an infrared light source disposed on the virtual reality glasses, especially two infrared LEDs, wherein the position of the virtual reality glasses is determined by a detecting device using the infrared light detected by the same. The advantage in this procedure is primarily that the infrared light cannot be perceived by the human eye, so that other people sitting or standing in the surroundings of the user wearing the virtual reality glasses are not disturbed by the infrared-based position detection.

According to another advantageous embodiment, it is provided that it is additionally detected whether a user has put the virtual reality glasses on, wherein the virtual object is only displayed by the display device in this case. For example, the virtual reality glasses can comprise suitable contact-sensitive sensors, which can be used in a contact region of the virtual reality glasses, which is usually in contact with the user when the virtual reality glasses are being worn, for checking whether a user has actually put the virtual reality glasses on. In other words, it is preferably not sufficient that the virtual reality glasses are disposed in the specified region. In addition, the condition must still be fulfilled that the virtual reality glasses have actually been put on by a user. This is because only in this case can it be assumed therefrom that the contents displayed by the virtual reality glasses are also seen by the user, and thus are also only at all relevant to consideration by any other people.

Another advantageous embodiment provides that the virtual object displayed by the display device is hidden once it is determined that the user has taken the virtual reality glasses off.

According to another advantageous embodiment, it is provided that a motor vehicle is displayed as the virtual object. A potential buyer can thus view for example his own special requested configuration of the motor vehicle in a simple way by the virtual reality glasses, wherein a salesperson or possibly also an associate can conveniently have the same contents displayed on the display device as are displayed to the potential buyer by the virtual reality glasses. Moreover, the use of the virtual reality glasses in the automobile context brings among other things the advantage that for example car dealerships do not need to provide a plurality of different vehicle versions with different equipment, because very different vehicle configurations can be displayed in a particularly realistic way and in a simple way by the virtual reality glasses.

The inventor also proposes a system that comprises a display device and virtual reality glasses, which are designed to display at least one virtual object from a virtual observation position. Moreover, the system comprises a detecting device that is designed to continuously detect a position of the virtual reality glasses and, using the continuously detected position of the virtual reality glasses, to determine whether the glasses are disposed in a specified region. Furthermore, the proposed system comprises a control device that is designed to activate the display device such that the virtual object is displayed from the same virtual observation position by the display device if the virtual reality glasses are disposed in the specified region. Advantageous embodiments of the proposed method are to be considered to be advantageous embodiments of the proposed system, wherein the system carries out the method.

Other advantages, features and details are revealed in the following description of preferred exemplary embodiments and using the figures. The features and combinations of features mentioned above in the description and the features and combinations of features mentioned below in the description of figures and/or shown in the figures alone are not only able to be used in the respectively specified combination, but also in other combinations or on their own without departing from the scope.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
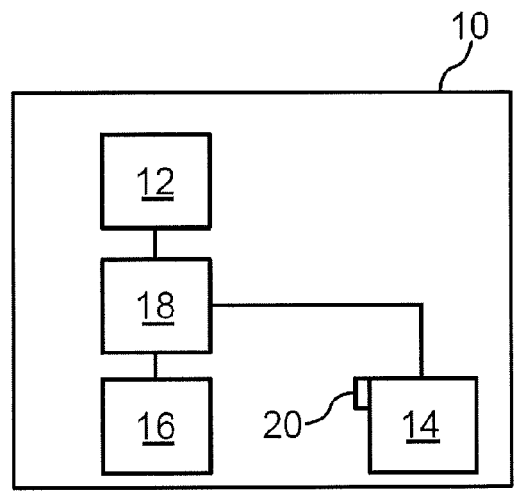
FIG. 1 shows a schematic representation of a system with virtual reality glasses for displaying virtual reality content.

Reference will now be made in detail to the preferred embodiments of the present invention, examples of which are illustrated in the accompanying drawings, wherein like reference numerals refer to like elements throughout.

In FIG. 1 a system 10 that is identified as a whole by 10 for displaying virtual reality content is shown. The system 10 comprises a display device 12 in the form of a computer display screen. Moreover, the system 10 comprises virtual reality glasses 14, a detecting device 16 and a control device 18. The virtual reality glasses 14 are in the present case designed to display a virtual motor vehicle that is not shown here from diverse virtual observation positions. Moreover, two infrared LEDs 20, by which infrared light can be emitted, are disposed on the virtual reality glasses 14.

The detecting device 16 is designed to continuously detect a position of the virtual reality glasses 14 and, using the continuously detected position of the virtual reality glasses 14, to determine whether the glasses are disposed in a specified region that is not illustrated here. For this, infrared light is emitted by the infrared LEDs 20, wherein the position of the virtual reality glasses 14 can be determined by the detecting device 16 using said detected infrared light. Moreover, the virtual reality glasses 14 can also comprise contact-sensitive sensors, by which it can be detected whether a user that is not illustrated here has put the virtual reality glasses 14 on.

Figure 2:
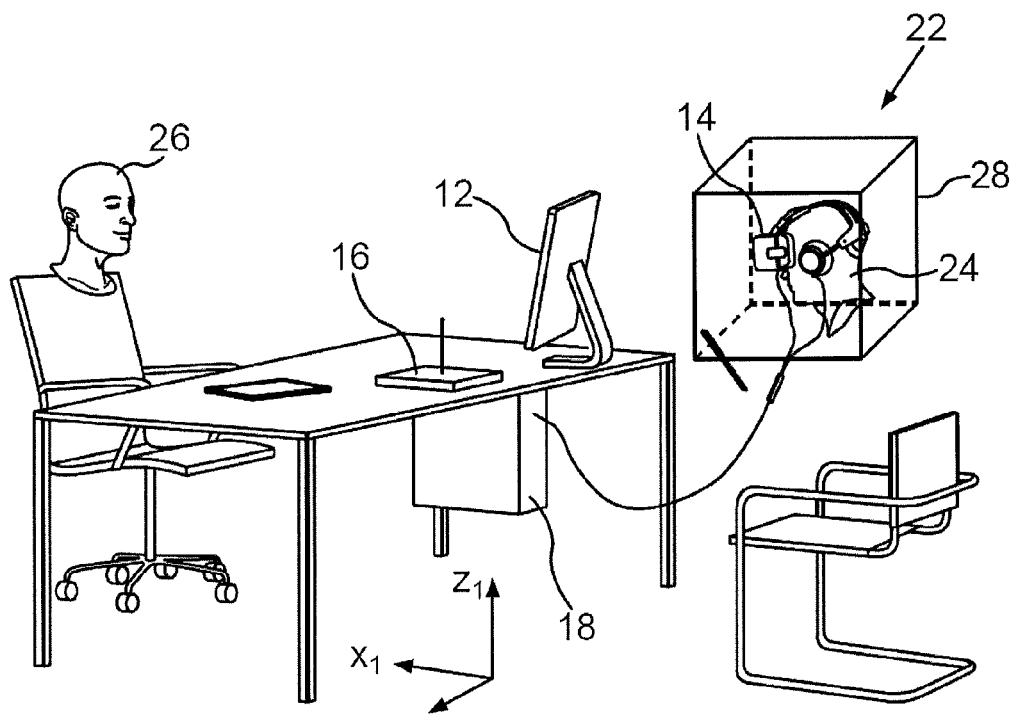
FIG. 2 shows a perspective view of a partly illustrated salesroom within a car dealership, wherein a user is wearing virtual reality glasses, by which a virtual motor vehicle is being displayed.

A salesroom 22 in an unspecified car dealership is represented in FIG. 2. A user 24 has put the virtual reality glasses 14 on, wherein a salesperson 26 is seated opposite the user 24. Both the content displayed by the virtual reality glasses 14 and the content displayed by the computer display screen 12 can be controlled by the control device 18. In FIG. 2 the previously mentioned specified region 28 is also schematically represented in the form of a cube. The detecting device 16 can detect the position of the virtual reality glasses 14 relative to the coordinate axes $x_1$, $y_1$ and $z_1$. Moreover, the exact dimensions and the position of the specified region 28 are available to the detecting device 18. This allows the detecting device 18 to determine in a simple way, using the detected position of the virtual reality glasses 14, whether the glasses are located within the specified region 28.

Figure 3:
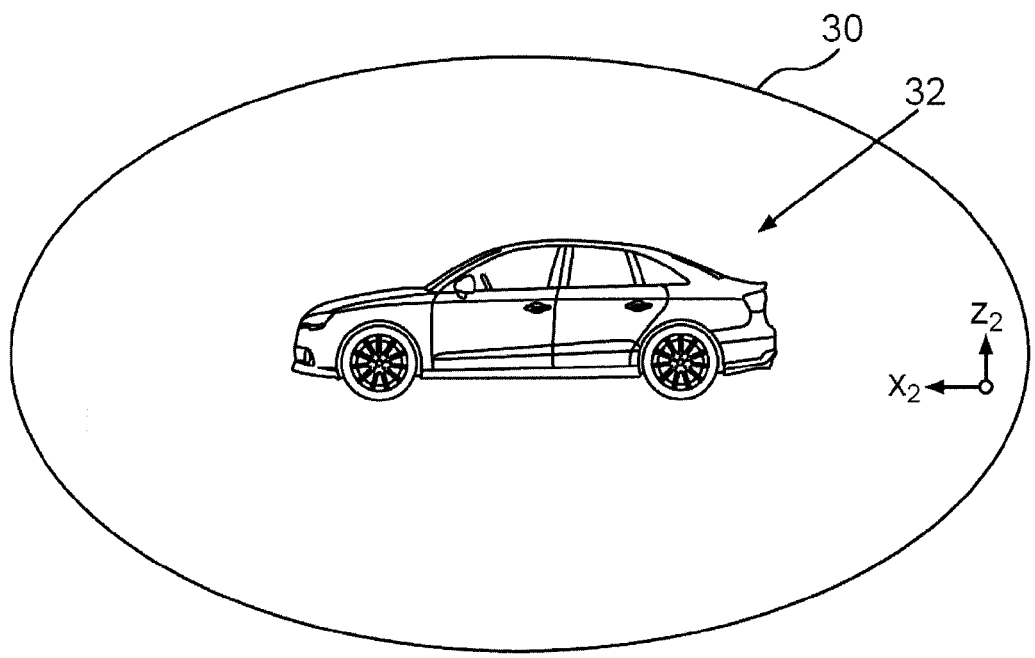
FIG. 3 shows a representation of a virtual motor vehicle that is displayed by the virtual reality glasses.

In FIG. 3 the virtual motor vehicle 32 already mentioned above is shown, which is displayed within a virtual environment 30 by the virtual reality glasses 14. Once the virtual reality glasses 14 are pivoted relative to the coordinate axes $x_1$, $y_1$ and/or $z_1$, there is an adjustment of the viewing angle to the virtual motor vehicle 32 by adjusting the view of the virtual motor vehicle 32 about the coordinate axes $x_2$, $y_2$ and/or $z_2$ according to the detected pivoting motion of the virtual reality glasses 14.

Moreover, the wearer 24 can also move his head for example in translation in the direction of the axes $x_1$, $y_1$ and/or $z_1$, wherein said movements cause a corresponding translational movement of the virtual reality glasses 14 because the user 24 is wearing the virtual reality glasses 14. Said translational movements of the virtual reality glasses 14 are converted during this such that the virtual observation position of the user 24 changes within the virtual environment 30. He can thus for example lean forward somewhat in order to observe the motor vehicle 32 in more detail, and can lean back somewhat in order to view the motor vehicle 32 from a greater distance and similar.

Figure 4:
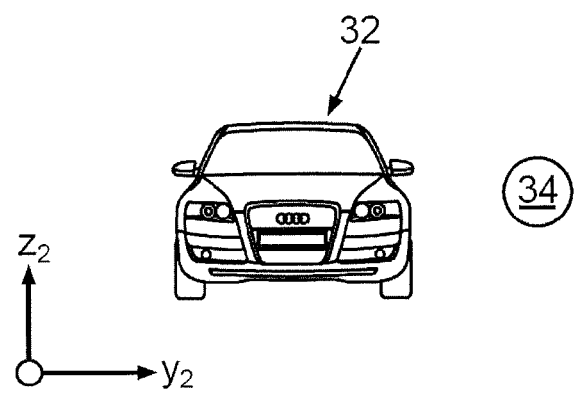
FIG. 4 shows a schematic frontal view of the motor vehicle displayed by the virtual reality glasses, wherein a virtual observation position of the user is identified.
Figure 5:
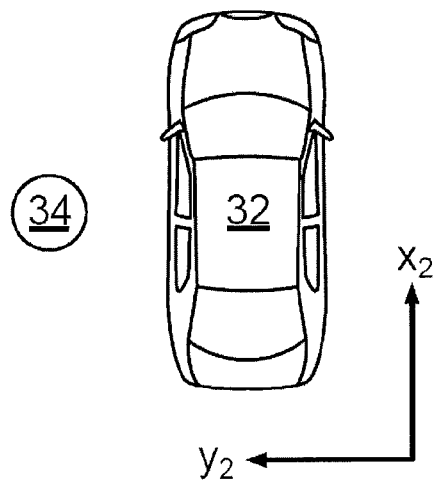
FIG. 5 shows a schematic top view of the virtual motor vehicle, wherein again the virtual observation position of the user is identified.

The virtual observation position according to FIG. 3 is identified in FIGS. 4 and 5 with the circle symbol 34. As can be seen in the front view of the motor vehicle 32 in FIG. 4 or in the top view of the vehicle 32, the virtual observation position according to FIG. 3 is disposed to the right of the center of the motor vehicle 32.

Figure 6:
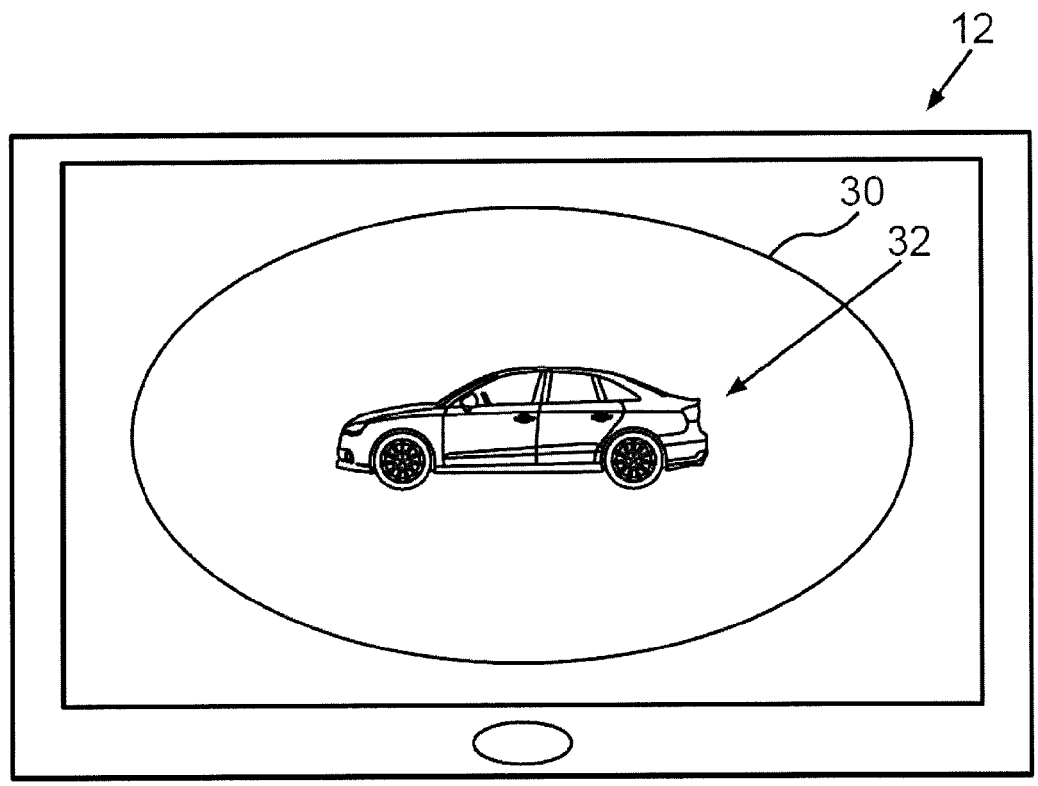
FIG. 6 shows a computer monitor, by which the same virtual environment is displayed together with the virtual motor vehicle as it is seen by the user through the virtual reality glasses.

In FIG. 6 the display screen 12 is illustrated, wherein the same virtual environment 30 and thus the same virtual motor vehicle 32 as can be perceived by the user 24 are displayed. If the virtual viewing angle of the virtual motor vehicle 32 is changed by pivoting the head of the user 24, then at the same time the content displayed on the display screen 12 is changed in just the same way. In other words, exactly the same is displayed on the display screen 12 as the user 24 can see through the virtual reality glasses 14. However, this only makes sense if the user 24 has also put the virtual reality glasses 14 on, because otherwise it would be irrelevant for the salesperson 26 and possibly for another associate of the user 24 that is not shown for what the virtual reality glasses 14 are currently showing to appear on the display screen 12, since the user 24 cannot see this because the virtual reality glasses 14 are not being worn.

Therefore, the position of the virtual reality glasses 14 is continuously detected by the detecting device 16 and, using the determined position of the virtual reality glasses 14, a check is made as to whether the glasses are disposed in the specified region 28. The motor vehicle 32 disposed within the virtual environment 30 is only displayed by the display screen 12 while the virtual reality glasses 14 are disposed in the specified region 28. The virtual environment 30 and also the motor vehicle 32 are thus hidden once it is determined that the virtual reality glasses 14 are disposed outside of the specified region 28. This is usually carried out if the user 24 takes the virtual reality glasses 14 off. Using the position detection of the virtual reality glasses 14 and the determination of whether the virtual reality glasses 14 are disposed within the specified region 28, it can be determined in a fairly reliable way whether the user 24 has yet put the virtual reality glasses 14 on.

In addition, it can still be detected whether the user 24 has actually put the virtual reality glasses 14 on, wherein only in this case will the motor vehicle 32 be displayed within the virtual environment 30 by the display screen 12 exactly as is carried out by the virtual reality glasses 14. For example, using suitable contact-sensitive sensors on the virtual reality glasses 14 it can be detected whether the virtual reality glasses 14 are actually currently being worn by the user 24 or whether he has already taken them off.

Thus if the virtual reality glasses 14 are actually still located in the specified region 28, although the user 24 has taken them off, for example because he is currently still holding them in his hands and in front of his face, the motor vehicle 32 together with the virtual environment 30 will nevertheless no longer be displayed by the display screen 12 because in any case the user 24 will no longer be seeing the virtual environment 30 together with the virtual motor vehicle 32 because of the virtual reality glasses 14 having been taken off.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for operating a display device, comprising:
   displaying a virtual object using virtual reality glasses, the virtual object being displayed for viewing from a virtual observation position;
   continuously detecting a position of the virtual reality glasses;
   continuously determining whether the position of the virtual reality glasses is disposed in a specified region that is defined as a region in physical space with respect to a head of a user wearing the virtual reality glasses;
   if the virtual reality glasses are disposed in the specified region based on the continuously determining, displaying the virtual object on an external display device for viewing from the same virtual observation position as used by the virtual reality glasses to display the virtual object; and
   if the virtual reality glasses are not disposed in the specified region based on the continuously determining, determining a content to be displayed on the external display device independently of the position of the virtual reality glasses and displaying the content on the external display device,
   wherein
   the region in physical space is a three-dimensional volume that surrounds and is spaced apart from the head of the user by a distance that corresponds to a typical range of movement of a head of a human.

2. The method according to claim 1, wherein
   if the virtual reality glasses are not disposed in the specified region based on the continuously determining, the display of the virtual object on the external display device is terminated.

3. The method according to claim 1, wherein
   infrared light is emitted by an infrared light source disposed on the virtual reality glasses, and
   a detecting device continuously determines the position of the virtual reality glasses by detecting the infrared light emitted by the infrared light source.

4. The method according to claim 3, wherein
   the infrared light source comprises two infrared light emitting diodes (LEDs).

5. The method according to claim 1, further comprising:
   detecting whether the virtual reality glasses are being worn by the user; and displaying the virtual object on the external display device only if the virtual reality glasses are being worn by the user.

6. The method according to claim 5, further comprising:
displaying the virtual object using the virtual reality glasses only if the virtual reality glasses are being worn by the user.

7. The method according to claim 1, further comprising terminating the display of the virtual object on the external display device if the user removes the virtual reality glasses from the head of the user.

8. The method according to claim 1, wherein
the virtual object is a motor vehicle.

9. The method according to claim 1, wherein
if the virtual reality glasses are disposed in the specified region, when the virtual observation position is changed the external display device simultaneously changes a content displayed by the external display device to correspond to the change in the virtual observation position.

10. The method according to claim 1, wherein
the three-dimensional volume is a cubic volume.

11. The method according to claim 1, wherein
if the virtual reality glasses are not disposed in the specified region based on the continuously determining, the virtual object is displayed from a predetermined perspective on the external display device, independently of the position of the virtual reality glasses.

12. The method according to claim 1, wherein
if the virtual reality glasses are not disposed in the specified region based on the continuously determining, the virtual object is displayed from a predetermined rotating perspective on the external display device, independently of the position of the virtual reality glasses.

13. The method according to claim 1, wherein
if the virtual reality glasses are disposed in the specified region based on the continuously determining, the same content is simultaneously displayed on the virtual reality glasses and on the external display device.

14. The method according to claim 1, wherein
rotational movement of the virtual reality glasses within the specified region changes a viewing angle of the virtual object without changing the virtual observation position,
translational movement of the virtual reality glasses within the specified region changes the virtual observation position without changing the virtual viewing angle, and
if the virtual reality glasses are disposed in the specified region based on the continuously determining, a change in at least one of the virtual viewing angle and the virtual observation position a simultaneously changes a content displayed by the external display device to correspond to the change in the at least one of the virtual viewing angle and the virtual observation position.

15. A system, comprising:
an external display device;
virtual reality glasses to display a virtual object for viewing from a virtual observation position;
a detecting device to continuously detect a position of the virtual reality glasses and, using the position of the virtual reality glasses, to continuously determine whether the virtual reality glasses are disposed in a specified region that is defined as a three-dimensional volume in physical space that surrounds and is spaced apart from a head of a user by a distance that corresponds to a typical range of movement of a head of a human; and
a control device to activate the external display device such that if the virtual reality glasses are disposed in the specified region, the virtual object is displayed on the external display device, for viewing from the same virtual observation position as used by the virtual reality glasses to display the virtual object, and if the virtual reality glasses are not disposed in the specified region, determining a content to be displayed on the external display device independently of the position of the virtual reality glasses and controlling the external display device to display the content on the external display device.

16. A method for operating a display device, comprising:
continuously detecting a position of virtual reality glasses;
continuously detecting whether the virtual reality glasses are disposed on a head of a user and whether the virtual reality glasses are disposed in a specified region that is defined as a three-dimensional volume in physical space that surrounds and is spaced apart from the head of the user by a distance that corresponds to a typical range of movement of a head of a human;
dynamically determining a virtual observation position from which a virtual object can be viewed in a virtual environment, the virtual observation position being determined so as to correspond with the position of the virtual reality glasses;
if the virtual reality glasses are disposed on the head of the user and are disposed in the specified region, displaying the virtual object by the virtual reality glasses and by an external display device, both for viewing from the virtual observation position; and
if the virtual reality glasses are not disposed on the head of the user or if the virtual reality glasses are not disposed in the specified region, determining a content to be displayed on the external display device independently of the position of the virtual reality glasses and displaying the content on the external display device.

17. The method according to claim 16, wherein
contact-sensitive sensors are provided on the virtual reality glasses to detect contact with the user and detect whether the virtual reality glasses are disposed on the head of the user.

18. The method according to claim 16, wherein
the three-dimensional volume is a cubic volume.

19. The method according to claim 1, changing at least one of a viewing angle and the virtual observation position, according to a change in the position of the virtual reality glasses in the specified region.

* * * * *